United States Patent Office 2,748,745
Patented June 5, 1956

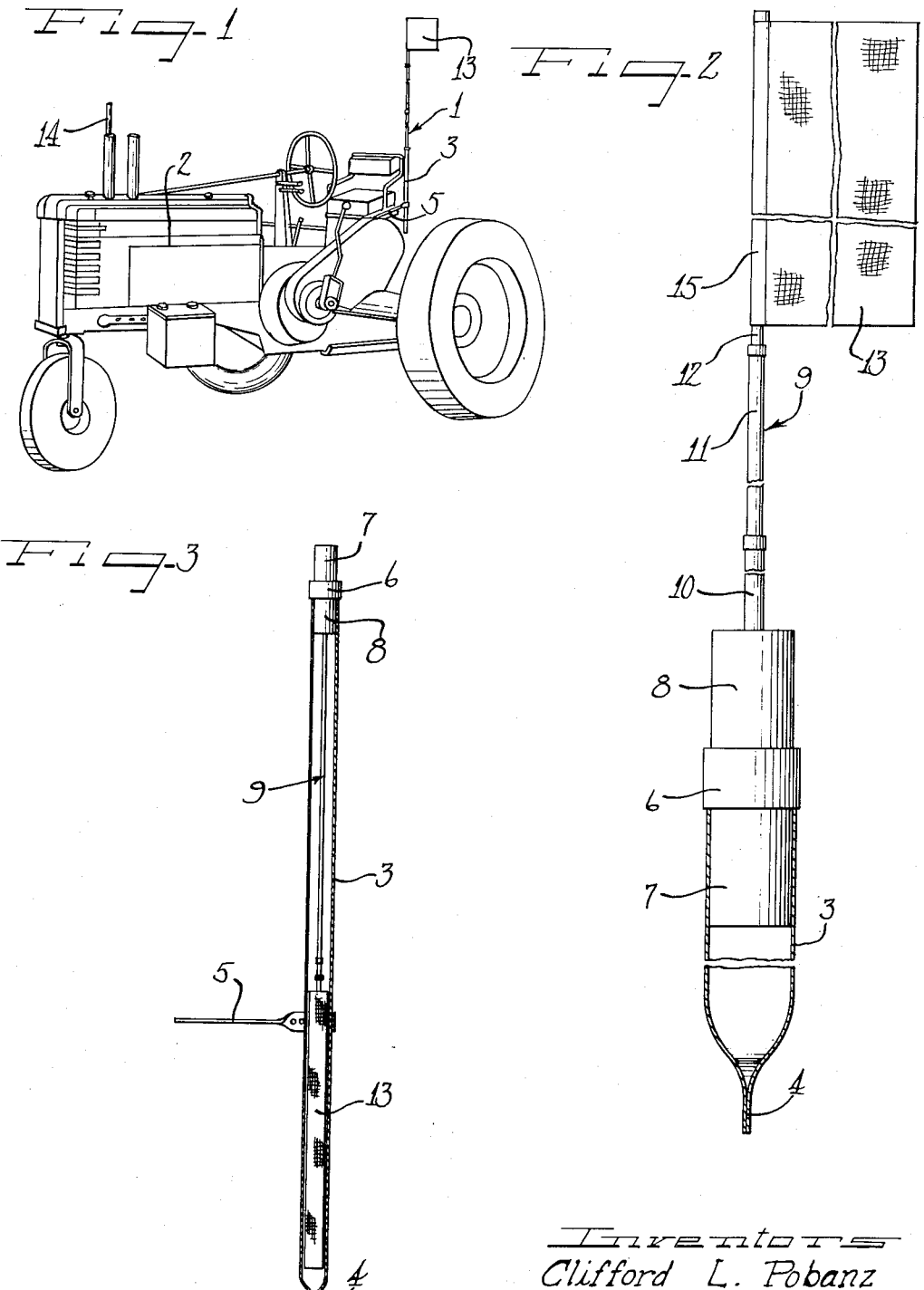

2,748,745
SAFETY MEANS FOR VEHICLES

Clifford L. Pobanz and Wilbur T. Pobanz, Galva, Ill.

Application September 23, 1954, Serial No. 457,952

2 Claims. (Cl. 116—173)

This invention relates to improvements in safety means for vehicles, and more particularly to a safety signal device highly desirable for use on relatively slow moving vehicles on public highways to provide increased vision to the drivers of other vehicles approaching the signal carrying vehicle from either direction, although the device will have other uses and purposes as will be apparent to one skilled in the art.

In the past, travel upon an open highway by a farm tractor or similar necessarily slow moving vehicle was frought with danger. The main danger was the fact that the slow moving vehicle would not be visible to the driver of an oncoming high speed vehicle in sufficient time to slow down the high speed vehicle and avoid a collision. This was particularly true where the tractor or other slow moving vehicle turned upon the highway from a side road at the base of a hill, where a high speed vehicle approaching the crest of the hill would not see the slow moving vehicle in time to successfully apply the brakes and avoid colliding with the rear of the slow moving vehicle, particularly if another vehicle was approaching from the opposite direction preventing proper passing.

In the past, certain devices have been developed in order to provide increased vision to an oncoming driver indicating the presence of another vehicle, but such devices have heretofore proven objectionable for various reasons. In some cases it was necessary to drive with the signal device at all times, and when such a signal device projected materially above a tractor, it was necessary to remove the device before entering a barn or shed because of the low clearance of the doorway. Further, when the vehicle was being used in a field, or elsewhere than on an open highway, the signal was still predominantly displayed uselessly, and the signal device could not be protected from the weather when not in use, unless entirely removed from the vehicle, an irksome and time consuming task.

Further, in case of emergency, the signal device could not be removed from the vehicle with sufficient dispatch to function as a hand signal.

With the foregoing in mind, it is an important object of the instant invention to provide a simple form of safety signal device for a vehicle which is readily attached to the vehicle in a simple and economical manner, and which adds at least 50% to the range of visibility of an oncoming driver.

Also an object of this invention is the provision of a safety device for vehicles which may simply and readily be adjusted to a desired height.

It is also a feature of this invention to provide a safety signal device for vehicles which may readily be adjusted to a sufficiently low height, without removal from the vehicle to pass through a doorway of relatively low clearance.

Still another object of the invention resides in the provision of a safety device for vehicles embodying a casing which may be permanently or semi-permanently mounted on the vehicle, and which encloses the entire safety device whenever desired.

A further object of the invention resides in the provision of a safety signal assembly for a vehicle so constructed as to be entirely weatherproof when not in use.

It is still another feature of the invention to provide a safety signal device for a vehicle including a telescopic rod, adjustable to a desired height within the limit of its extension, and which carries a signal device at the free end thereof.

Still a further object of the invention resides in the provision of a safety signal device for vehicles, and the like, embodying a socket of sufficient size to contain the entire signal device, when not in use, so the device may always be carried upon the vehicle ready for use whenever needed.

Also an object of the invention is the provision of a signal device mounted on a vehicle to increase visibility of oncoming drivers, and which in case of accident or emergency, may quickly be removed from the vehicle and utilized as a hand signal to flag oncoming traffic.

A further object of the invention resides in the provision of an extensible safety signal device comprising a socket, and an extensible rod carrying the signal itself, the extensible rod being mounted on a centrally flanged double ended plug, either end of which may be readily inserted in the socket, with the signal device projecting out above the socket, or encased within the socket, as may be desired.

While some of the more salient features, characteristics and advantages of the instant invention have been above pointed out, others will become apparent from the following disclosures, taken in conjunction with the accompanying drawing, in which—

Figure 1 is a perspective view of a tractor equipped with a safety signal device embodying improvements of the instant invention;

Figure 2 is an enlarged fragmentary, part sectional, part elevational view, of the signal device itself; and Figure 3 is a central vertical sectional view through the signal device, with parts shown in elevation, showing the signal device in retracted position and encased within the socket member.

As shown on the drawings:

It will, of course, be understood that the instant invention may be utilized on substantially any desirable character of vehicle, but will most frequently be utilized on a slow moving vehicle such as a mobile piece of farm machinery, road working machinery, or other types of mobile devices that are not adapted for fast travel.

By way of example, the instant invention, generally indicated by numeral 1, is shown mounted in operative position upon a farm tractor 2. In case of the illustrated showing, the signal device is shown attached to the under support of the driver's seat, but as will be well known to one skilled in the art, the indicating device or signal may be attached to the tractor in any suitable or readily available location.

With reference more particularly to Fig. 3, it will be seen that the safety signal assembly embodies a tubular socket member 3, closed at the bottom end as indicated at 4, and open at the top or upper end. Secured to the socket 3 in any suitable manner is a laterally extending bracket 5 by means of which the device may readily and firmly be secured to a vehicle such as the tractor 2, in any suitable manner. Once attached to the vehicle, there is no necessity for removing the socket unless it is desired to transfer the entire signal assembly to another vehicle.

The safety signal itself is carried on a plug having a central outstanding flange 6 and a pair of projecting like ends 7 and 8, either of which fits intimately into the open end of the socket 3, the flange functioning as a closure for the socket whenever either end is inserted into the socket as seen clearly in Figs. 2 and 3, Fig. 2 showing the end 7 inserted in the stocket, while Fig. 3 shows the end 8 inserted in the socket.

Firmly secured in one end of the double ended plug, and in the illustrated instance it is the end 8 of the plug, is an extensible rod-like support generally indicated by numeral 9. This extensible or telescopic rod comprises a plurality of sections 10, 11 and 12, or more if desired, all sections except the outermost section being hollow and progressively sized for telescopic retraction one within the other. The outer section may, of course, be solid.

By way of example, and not by way of limitation, we have illustrated the signal itself in the form of a flag 13 secured to the outermost telescopic section 12. Preferably, the flag is red, denoting danger in the customary manner. When the telescopic sections of the rod 9 are extended, as seen in Figs. 1 and 2, the flag projects well above the vehicle or tractor 2, and a satisfactory size of telescopic support is one that will give an elevation of 8 feet above the socket 3.

Preferably, the socket 3 is so mounted on the tractor that it will not extend above the stack 14 of the tractor, and so the safety device will always clear any low doorway that the tractor may pass through. If so desired, the socket may be mounted so that when the telescopic rod 9 is retracted, the signal flag 13 will not project above the tractor stack.

In use, it is a simple expedient for the operator of the vehicle to extend the rod 9 to its maximum limit before entering upon an open highway. In order to effect the desired extension, it is not necessary for the operator to climb upon a high portion of the vehicle, but it is a simple expedient to remove the end 7 of the plug from the socket 3, make the desired extension of the rod 9, and then reinsert the extended signal device in the socket. When the signal assembly is not necessary, it is a simple expedient to retract the rod 9, wind the flag 13 around the retracted rod, insert the device in reverse order in the socket 3, with the end 8 of the plug received by the socket as seen in Fig. 3. In this position, the entire signal device is completely enclosed in the socket, and again the flange 6 effects an adequate closure for the socket so that the signal device is adequately protected from the weather. Thus, the complete assembly need not be removed from the tractor or other vehicle when it is not desired to utilize the danger signal.

The socket 3 is preferably made of metal or other equivalently durable material, the rod 9 is preferably of steel or the like, while the plug having the double ends 7 and 8 may be made of wood, plastic, or equivalent material. The flag may readily be removed and replaced from the end section of the telescopic rod, and the flag may be so constructed that the loop portion 15 thereof may pass over the next adjacent section in the event the flag is too wide for complete collapsing of the rod.

It will also be especially noted that when the signal is in use, should an accident or emergency occur, it is a simple expedient for the driver to lift the end 7 of the plug out of the socket 3, and utilize the plug as a handle for hand flagging or guiding of traffic in either direction around the locale of the accident or emergency. Another use for the instant invention is to enable a farmer or supervisor to ascertain where and how steady a tractor may be operating in a particular field, since if the signal is elevated, it will be visible for a relatively long distance.

From the foregoing, it will be apparent that we have provided a highly efficient safety means for vehicles, whereby the driver can increase by a considerable extent the vision of oncoming drivers in either direction to indicate that a slow moving vehicle is present on the open highway. The device is easily and readily mounted upon a vehicle, may be left on the vehicle, and is simply and easily adjusted for use or storage. When stored in the socket 3 as shown in Fig. 3, the device is protected from all kinds of weather. Further, the entire invention is simple in construction, highly durable, and economical to manufacture.

It will be understood that modifications and variations may be effected without departing from the scope of the novel concepts of the present invention.

We claim as our invention:

1. A safety flag assembly comprising a socket, a centrally flanged plug either end of which intimately seats in said socket, a telescopic rod on one end of said plug, a signal flag on the free end of said rod, and said socket being of uniform cross-sectional area and of sufficient length to receive said rod in retracted position with the flag wrapped therearound.

2. A safety signal assembly comprising a cylindrical member having a closed end and an open end upwardly positioned to function as a socket, a double ended plug for the intimate seating of either end thereof in said socket, a telescopic rod carried by one end of the plug, a signaling element carried by the free end of said rod, said cylindrical member being of sufficient length to receive the rod in retracted position, and means to connect said member to a vehicle.

References Cited in the file of this patent

UNITED STATES PATENTS

| | | |
|---|---|---|
| 1,090,070 | Keene | Mar. 10, 1914 |
| 1,302,190 | McCormack | Apr. 29, 1919 |
| 2,324,614 | Dalton | July 20, 1943 |